(12) United States Patent
Katano et al.

(10) Patent No.: US 9,513,478 B2
(45) Date of Patent: Dec. 6, 2016

(54) MIRROR SYSTEM AND CONTROL METHOD THEREFOR

(71) Applicant: CANON KABUSHIKI KAISHA, Tokyo (JP)

(72) Inventors: Yasuo Katano, Kawasaki (JP); Masakazu Matsugu, Yokohama (JP); Masahiro Suzuki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 410 days.

(21) Appl. No.: 13/865,917

(22) Filed: Apr. 18, 2013

(65) Prior Publication Data

US 2013/0286047 A1    Oct. 31, 2013

(30) Foreign Application Priority Data

Apr. 25, 2012  (JP) ................................. 2012-100347

(51) Int. Cl.
| | |
|---|---|
| *G02B 27/01* | (2006.01) |
| *G06T 11/60* | (2006.01) |
| *H04N 5/232* | (2006.01) |
| *G06T 11/00* | (2006.01) |

(52) U.S. Cl.
CPC .......... *G02B 27/0101* (2013.01); *G06T 11/00* (2013.01); *G06T 11/60* (2013.01); *H04N 5/23293* (2013.01)

(58) Field of Classification Search
None
See application file for complete search history.

(56) References Cited

U.S. PATENT DOCUMENTS

| | | |
|---|---|---|
| 5,127,029 A | 6/1992 | Suzuki et al. |
| 6,757,422 B1 | 6/2004 | Suzuki et al. |
| 6,856,341 B2 | 2/2005 | Suzuki |
| 6,927,955 B2 | 8/2005 | Suzui et al. |
| 7,562,985 B2 * | 7/2009 | Cortenraad et al. ............ 353/28 |
| 7,707,128 B2 | 4/2010 | Matsugu |
| 7,766,828 B2 | 8/2010 | Ishii et al. |
| 8,416,722 B2 | 4/2013 | Suzuki |

(Continued)

FOREIGN PATENT DOCUMENTS

| | | |
|---|---|---|
| JP | 2006-330011 A | 12/2006 |
| JP | 2009-156990 A | 7/2009 |
| JP | 2013-080043 A | 5/2013 |

OTHER PUBLICATIONS

U.S. Appl. No. 13/784,684, filed Mar. 4, 2013.

(Continued)

*Primary Examiner* — Edward Martello
(74) *Attorney, Agent, or Firm* — Fitzpatrick, Cella, Harper & Scinto

(57) ABSTRACT

In a mirror system for displaying an image on a mirror surface, a mirror reflects incident light from an object facing its front surface side to present a reflected image, and transmits incident light from its rear surface. A display unit generates a presentation image to be superimposed on the reflected image. An optical unit is arranged between the display unit and the rear surface of the mirror, and images the presentation image. An acquisition unit acquires distance information between the object and the mirror. A controller controls the imaging point of the presentation image by the optical unit according to the distance information.

11 Claims, 8 Drawing Sheets

(56) References Cited

U.S. PATENT DOCUMENTS

| | | |
|---|---|---|
| 8,437,003 B2 | 5/2013 | Yoshikawa et al. |
| 2008/0211904 A1 | 9/2008 | Kato et al. |
| 2009/0310583 A1 | 12/2009 | Suzuki |
| 2011/0107216 A1* | 5/2011 | Bi .......................... G06F 3/011 |
| | | 715/716 |
| 2011/0206237 A1 | 8/2011 | Saruta et al. |

OTHER PUBLICATIONS

U.S. Appl. No. 13/781,644, filed Feb. 28, 2013.
Japanese Office Action dated Feb. 22, 2016 in Japanese Application No. 2012-100347.

* cited by examiner

MIRROR SYSTEM AND CONTROL METHOD THEREFOR

BACKGROUND OF THE INVENTION

Field of the Invention

The present invention relates to a mirror system for superimposing and displaying an arbitrary image on the reflected image of an object.

Description of the Related Art

There have been proposed various mirror systems for displaying not only a reflected image but also a video on a mirror surface.

As applications of such a mirror system, a rehabilitation system for recovering the functions of a human body and a system for determining the quality of physical exercises for maintaining health have been proposed. In these system applications, it is expected to achieve effective rehabilitation and training by presenting, on a mirror surface, a video (to be referred to as an "evaluation index video" hereinafter) serving as an evaluation index such as the posture evaluation result and a past state of a treatment acceptor, and model movement by a trainer simultaneously with the reflected image of the treatment acceptor.

In the proposed techniques, a diffusion layer (screen) is arranged on the rear side of a half mirror forming the mirror surface to present a video. If, therefore, the above-described system applications present the posture of the treatment acceptor and its evaluation index, the following problems arise.

Since the depth of an image presentation surface is fixed on the screen, an evaluation index video with a depth different from that of a reflected image is presented. That is, since the focal length and the angle of convergence of the reflected image of the treatment acceptor are different from those of an image (to be referred to as a "presentation image" hereinafter) presented as an evaluation index video, it is difficult for the treatment acceptor to simultaneously observe his/her reflected image and the presentation image without changing the fixation point.

If, for example, the treatment acceptor fixes the eye on his/her reflected image at a depth twice the space (distance) between the treatment acceptor and the mirror, the presentation image looks blurred because the binocular parallax of the reflected image does not coincide with that of the presentation image on the mirror surface. To the contrary, if the treatment acceptor fixes the eye on the presentation image on the mirror surface, his/her reflected image at a deeper position in the mirror looks blurred.

If the treatment acceptor moves forward or backward, the position of the reflected image changes according to the movement but the presentation image fixed on the screen cannot follow the forward or backward movement of the treatment acceptor.

To evaluate movement of the treatment acceptor, it may be possible to superimpose and display a bone or computer graphics (CG) image corresponding to the posture as an evaluation index video for each part. In this case, however, the treatment acceptor may take a posture in which the depths of the respective parts such as the head and four limbs are different from each other, and it is difficult in such a case to superimpose the evaluation index video of each part on the posture and observe it.

To solve the above problems, it may be possible to add depth to display of the evaluation index video by using a three-dimensional (3D) display as a video presentation apparatus on the rear side of the half mirror. Even if the 3D display is used, an actually presented video is on the screen. Since, therefore, the depth of the reflected image of the treatment acceptor is different from that of the evaluation index video due to the angle of convergence adjustment mechanism and the focus adjustment mechanism of human eyeballs, it is difficult to present an appropriate video to the treatment acceptor.

SUMMARY OF THE INVENTION

In one aspect, a mirror system for displaying an image on a mirror surface, comprising: a mirror which reflects incident light from an object facing on a front surface side to present a reflected image, and transmits incident light from a rear surface; a display unit configured to generate a presentation image to be superimposed on the reflected image; an optical unit which is arranged between the display unit and the rear surface of the mirror, and images the presentation image; an acquisition unit configured to acquire distance information between the object and the mirror; and a controller configured to control an imaging point of the presentation image by the optical unit according to the distance information.

According to the aspect, it is possible to superimpose and display, on the reflected image of an object, a presentation image with a depth according to the depth of the reflected image.

Further features of the present invention will become apparent from the following description of exemplary embodiments with reference to the attached drawings.

DESCRIPTION OF THE EMBODIMENTS

Figure 1:
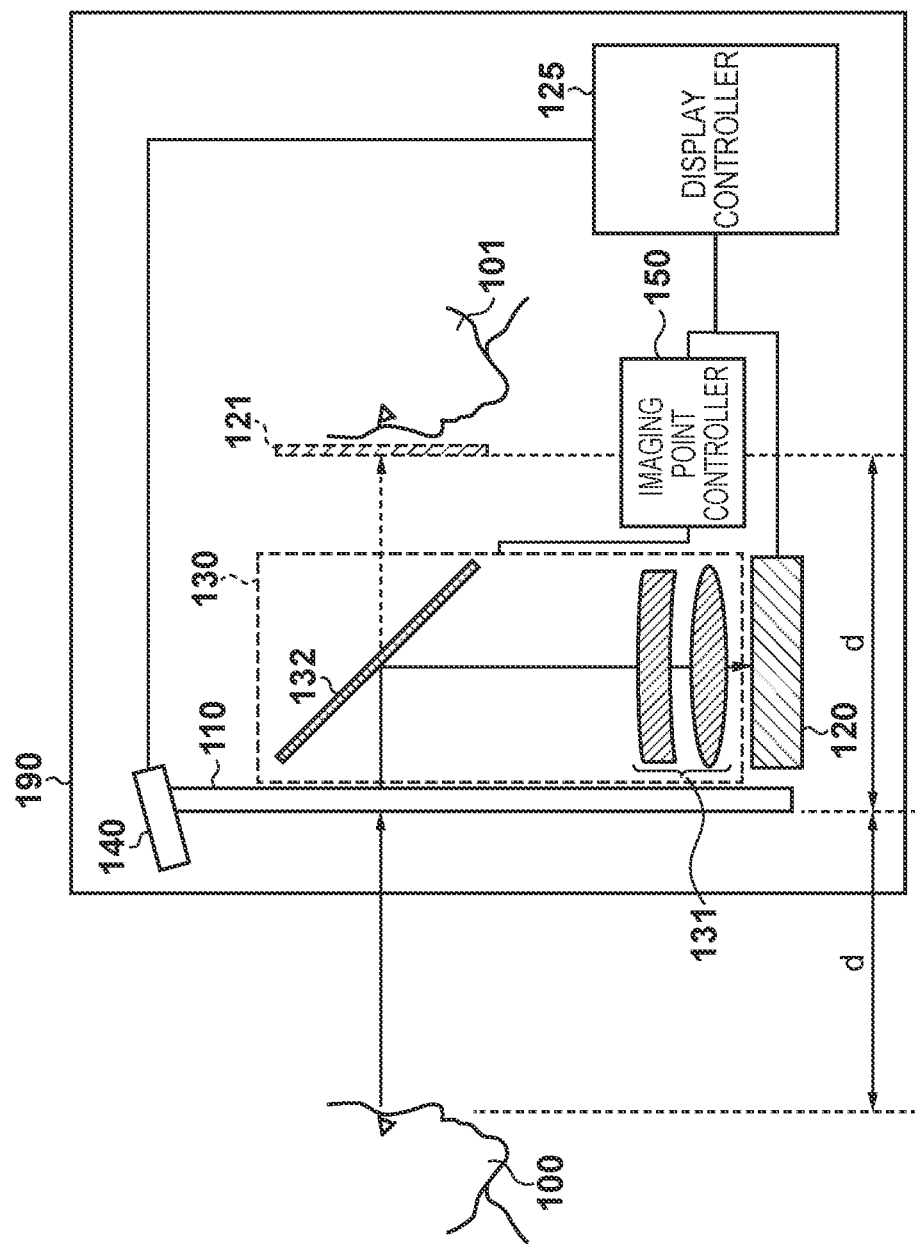
FIG. 1 is a block diagram showing the basic configuration of a mirror system according to the first embodiment.

A mirror system according to embodiments of the present invention will be described in detail below with reference to the accompanying drawings. Note that the following embodiments do not limit the present invention according to the scope of the appended claims, and all combinations of characteristic features described in the embodiments are not always essential to solving means of the invention.

First Embodiment

System Configuration

The basic configuration of a mirror system 190 according to the first embodiment will be described with reference to FIG. 1. The mirror system 190 shows, as an object, the reflected image of a user 100 of the system, and also superimposes a predetermined presentation image on the reflected image of the user.

The mirror system 190 includes a half mirror 110 which is arranged in front of the user 100 and shows his/her reflected image, and an image display unit 120 which displays an image to be superimposed on the reflected image. The mirror system 190 also includes a display controller 125 which generates a presentation image to be displayed on the image display unit 120 and controls display of the generated presentation image.

The mirror system 190 includes an optical system 130 which guides a predetermined presentation image toward the rear side of the half mirror 110 in order to present the presentation image to the user 100. Furthermore, the mirror system 190 includes an object position acquisition unit 140 which acquires the video of the user 100 facing a mirror surface and the distance between the user 100 and the mirror surface, and an imaging point controller 150 which controls the depth position of the virtual image of the presentation image.

The half mirror 110 is a translucent mirror which reflects some of incident light and transmits the remaining light. The ratio between the reflected light and the transmitted light is not limited to 1:1. The half mirror 110 presents, to the user 100 who is standing at a distance d from the mirror surface in front of it (on its front side), a reflected image 101 of the user 100 at the distance d behind the mirror surface (on its rear side), that is, a distance 2d from the user 100. At the same time, the half mirror 110 transmits, from its behind, the presentation image on the image display unit 120 which has been guided via the optical system 130, thereby presenting it to the user 100.

The image display unit 120 is, for example, a liquid crystal display, and displays an evaluation index video as a presentation image. The image display unit 120 is arranged so that its display surface faces upward in FIG. 1 to form right angles with the mirror surface of the half mirror 110.

The display controller 125 is, for example, a computer (PC) having an image generation function, and generates a predetermined presentation image to be superimposed on the reflected image and outputs it to the image display unit 120. Furthermore, based on depth information indicating the position of the user 100, which has been acquired from the object position acquisition unit 140, the display controller 125 calculates focal length information for controlling the position of the virtual image of the presentation image, and outputs it to the imaging point controller 150.

The optical system 130 is constituted by, for example, a lens system 131 including a plurality of lenses and a reflection mirror 132 serving as a light guide mirror. The optical system 130 guides the presentation image displayed on the image display unit 120 toward the rear surface of the half mirror 110, and transmits it. This enables to observe a virtual image 121 of the presentation image on the front surface side of the half mirror 110.

As will be described later, since the imaging point controller 150 adjusts the focal length of the lens system 131 of the optical system 130, the virtual image 121 of the presentation image is observed at a predetermined depth position. In the example shown in FIG. 1, the optical system 130 has been adjusted so that the virtual image 121 is imaged at a depth 2d from the user 100, that is, on the same plane as that of the reflected image 101 of the user 100.

The object position acquisition unit 140 is, for example, a stereo camera, and is arranged above the half mirror 110.

The object position acquisition unit 140 has a distance information acquisition function of measuring the position (distance d) of the user 100 facing the half mirror 110 and acquiring it as depth information simultaneously with capturing the image of the user 100. If the depth information acquired by the object position acquisition unit 140 is input to the display controller 125 together with the image of the user 100, the display controller 125 can detect the movement information of the user 100 in real time.

The display controller 125 generates focal length information based on the depth information from the object position acquisition unit 140. The imaging point controller 150 is connected to the optical system 130, and controls the focal length of the lens system 131 according to the focal length information input from the display controller 125. This processing adjusts the imaging point of the display image on the image display unit 120, thereby enabling to adjust the position of the virtual image 121 forward or backward with respect to the half mirror 110 (toward or away from the half mirror 110).

The relationship between the depth information and the focal length information depends on the arrangement of the optical system 130, the distance between the optical system 130 and the image display unit 120, and the like. Therefore, appropriate focal length information corresponding to the depth information is, for example, measured in advance, and a table indicating the relationship between the depth information and the focal length information is held in the display controller 125 based on the measurement result.

[Processing of Superimposing Presentation Image]

The mirror system 190 according to the first embodiment implements a rehabilitation system for recovering the functions of a human body. That is, a presentation image serving as an evaluation index video is generated as a CG image for movement of the treatment acceptor, and a virtual image of the presentation image and a reflected image of the treatment acceptor are superimposed and presented so as to observe both the virtual image and the reflected image. Processing of superimposing the presentation image on the reflected image of the treatment acceptor will be described in detail below with reference to FIGS. 2 and 3.

Figure 2:
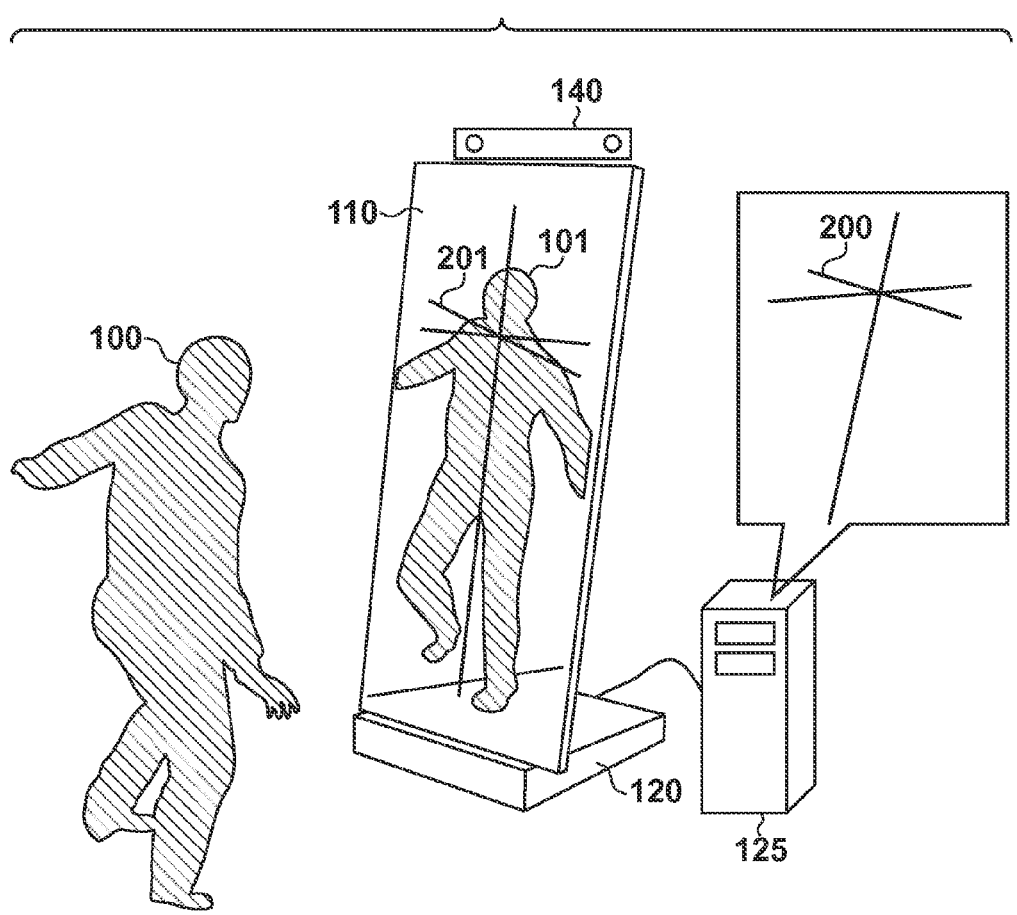
FIG. 2 is a view showing the use of the mirror system according to the first embodiment.

FIG. 2 is a view showing the use of the mirror system according to the first embodiment, and shows a case in which the treatment acceptor 100 is standing in front of the half mirror 110, and is undergoing physical rehabilitation. The half mirror 110 displays the reflected image 101 of the treatment acceptor 100 at a depth d (the distance between the treatment acceptor 100 and the half mirror 110) from the mirror, and shows the rehabilitation of the treatment acceptor 100.

At this time, the display controller 125 acquires the depth information (distance d) and the posture video of the treatment acceptor 100 captured by the object position acquisition unit 140, and calculates, based on the posture video, an evaluation index 200 such as an index representing the body axis and an index representing the levelness of the shoulders. The display controller 125 then generates the CG image (image data) of a presentation image according to the current posture of the treatment acceptor 100 based on the evaluation index 200, and supplies it to the image display unit 120.

The presentation image displayed on the image display unit 120 is transmitted from the rear surface side of the half mirror 110 via the optical system 130, thereby presenting a virtual image 201 of the presentation image to the treatment acceptor 100. At this time, the virtual image 201 is positioned at the same depth as that of the reflected image 101 of the treatment acceptor 100, and thus the treatment acceptor 100 observes it as an image with the same depth. A detailed description thereof will be given later. With this processing, the virtual image 201 of the evaluation index according to the rehabilitation movement is superimposed as an image having the same angle of convergence and focal length as those of the reflected image 101, thereby enabling the treatment acceptor 100 to simultaneously observe his/her reflected image 101 and the virtual image 201.

Figure 3:
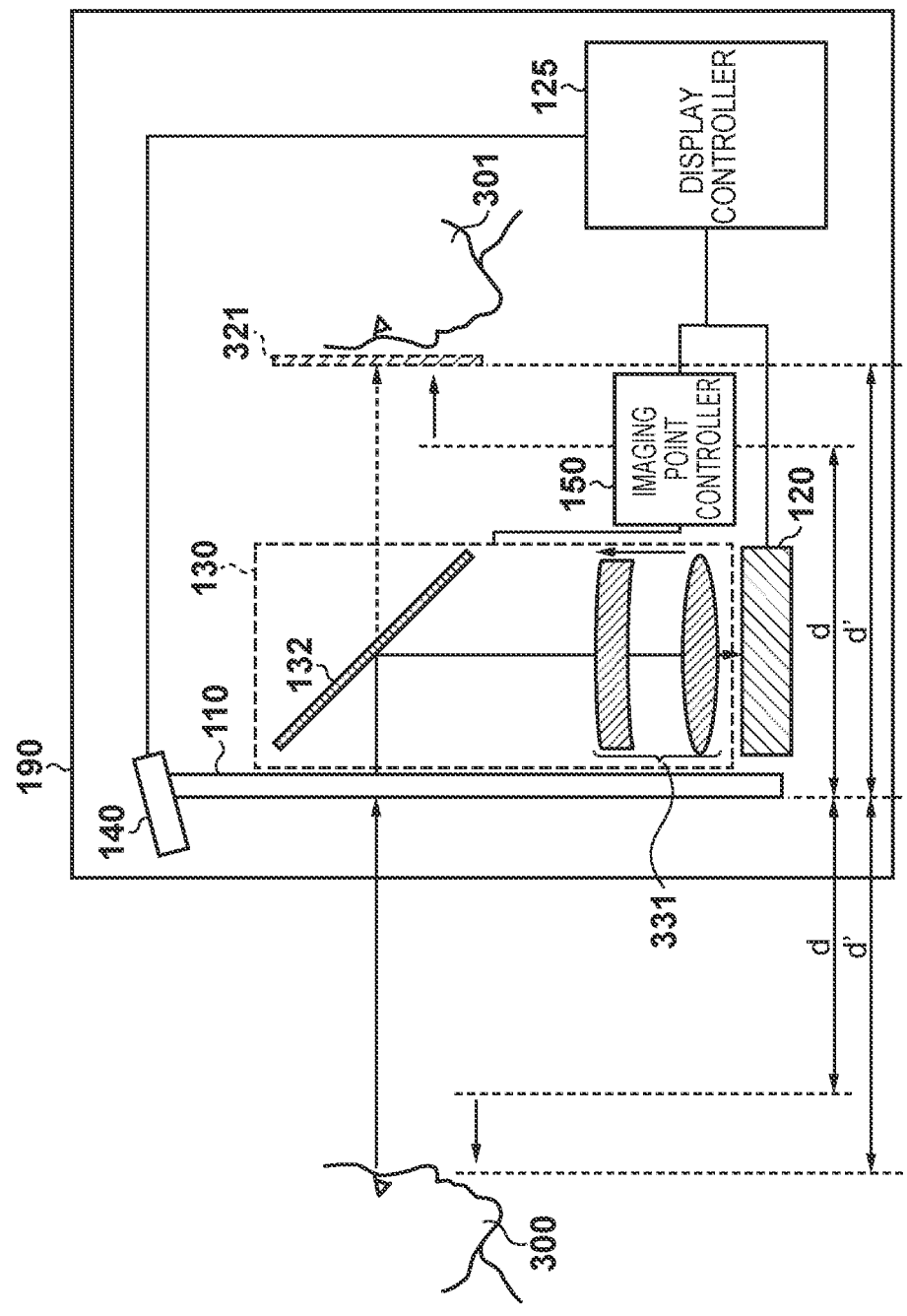
FIG. 3 is a block diagram showing a configuration when the position of a treatment acceptor changes from that shown in FIG. 1.

A display operation when the treatment acceptor 100 moves forward or backward will now be described. If the treatment acceptor 100 moves backward in the state (the distance between the treatment acceptor 100 and the half mirror 110 is d) shown in FIG. 1, the distance between the treatment acceptor 100 and the half mirror 110 becomes d', as shown in FIG. 3. Reference numeral 300 denotes a treatment acceptor when the distance is d'. In this case, a reflected image 301 of the treatment acceptor 300 is displayed at a depth position of d' behind the mirror surface.

The object position acquisition unit 140 acquires the distance d', the display controller 125 controls focal length information based on the distance d', and the imaging point controller 150 controls the focal length of the optical system 130 based on the focal length information.

The imaging point controller 150 controls the focal length of the optical system 130 by changing the lens position in the optical system 130 from the state denoted by reference numeral 131 in FIG. 1 to the state denoted by reference numeral 331 in FIG. 3. This operation changes the imaging point of the evaluation index 200 displayed on the image display unit 120, and the treatment acceptor observes a virtual image 321 at the distance d' behind the mirror surface of the half mirror 110. The treatment acceptor 300 can, therefore, observe the presentation image of the evaluation index 200 at the same depth, that is, the same distance d', as that of the reflected image 301 after the movement. In other words, the treatment acceptor 300 can simultaneously observe the reflected image 301 and the virtual image 321 without changing the fixation point.

As described above, it is possible to arrange the virtual image of the presentation image at a position where the same angle of convergence and focal length as those of the reflected image of the user of the system are obtained, by enabling to adjust the depth of the virtual image to have plane symmetry with the forward or backward movement of the user. This allows the user to simultaneously, visually perceive his/her reflected image and the presentation image.

Modification of First Embodiment

In FIG. 3, the virtual image 321 need not always be at the same depth as that of the reflected image of the treatment acceptor 300. The virtual image 321 need only be presented as an image with a depth according to the distance between the treatment acceptor 300 and the half mirror 110.

In the above embodiment, the presentation image displayed on the image display unit 120 is guided to the rear surface of the mirror using the half mirror 110 to present the presentation image to the user of the system. The present invention is not limited to the half mirror and, for example, a total reflection mirror may be used as long as it can present the reflected image and presentation image on planes with the same depth.

Furthermore, in the above embodiment, the object position acquisition unit 140 is a stereo camera. The present invention is not limited to such an image capturing apparatus, and it is only necessary to measure the depth position (distance d) of the user of the system. Therefore, a focusing system using the TOF (Time Of Flight) method or a technique of performing focusing using a distance sensor such as a pyroelectric sensor or the like is possible. It is not necessary to include the object position acquisition unit 140 as an explicit component. The distance d to the user may be estimated by detecting the face of the user using an image input device such as a camera, and approximately calculating the distance based on the detected size.

In the above embodiment, a CG image as a guideline according to the posture of the user of the system is presented as the evaluation index 200. The evaluation index 200 superimposed as a presentation image, however, is not limited to this, and it is also possible to present a character, a video image such as the actually captured video of a physical therapist or instructor, and the like, as a matter of course.

Furthermore, in the above embodiment, the imaging point controller 150 controls the optical system 130 to change the imaging point of the virtual image. Other methods, however, are applicable as long as they can change the imaging point of the virtual image. For example, a method of controlling the position (distance) of the image display unit 120 with respect to the optical system 130 or a method of changing the display state of the image display unit 120 is possible.

Although the body of the user of the system has been exemplified as an object, the reflected image of which is reflected on the mirror system, the object is not limited to this, and a matter of course. For example, the object may be an object other than a person, or part of the object (or person).

Furthermore, in the above embodiment, the object is the user of the system, and the user observes his/her reflected image and the presentation image superimposed on it. A person who observes the reflected image, however, is not limited to the user, and another person (observer) in front of the mirror may observe the reflected image. Even if the user of the system is different from the observer, the observer can simultaneously visually perceive the reflected image of the user and the presentation image superimposed on it without changing the fixation point.

Second Embodiment

The second embodiment of the present invention will be described below. The second embodiment shows a case in which in the mirror system shown in the above-described first embodiment, a plurality of persons exist as objects, and a so-called simultaneous interpretation system which interprets the languages of the persons is implemented. Note that in the mirror system according to the second embodiment, the same components as those shown in FIG. 1 in the above-described first embodiment have the same reference numerals, and a description thereof will be omitted.

[System Overview]

Figure 4:
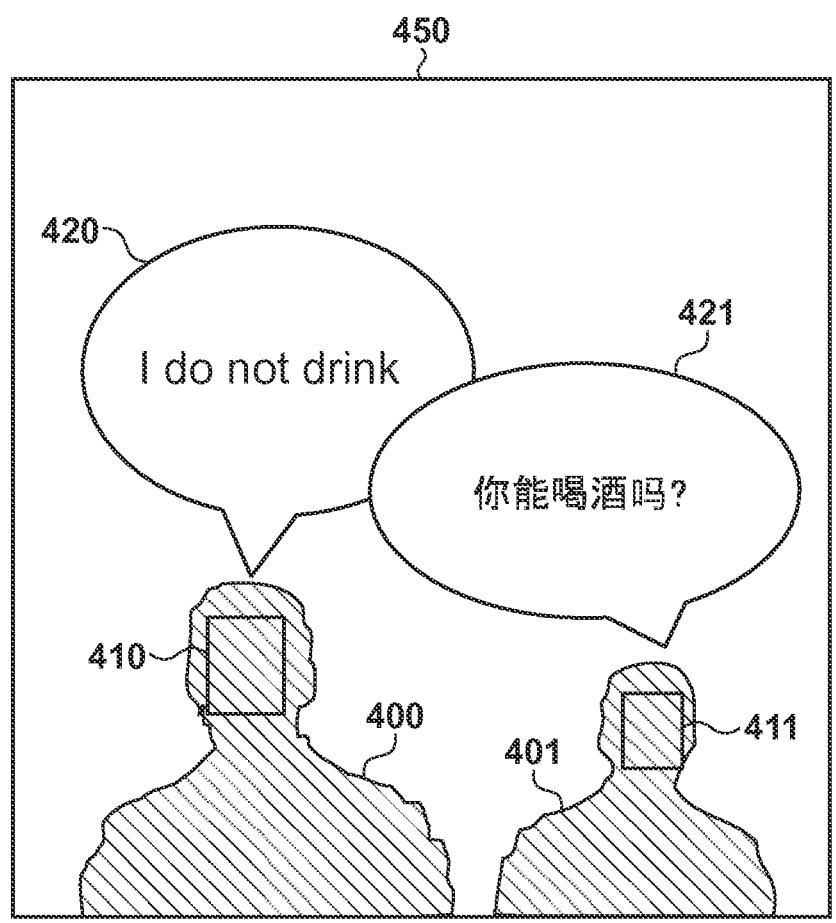
FIG. 4 is a view showing the use of a mirror system according to the second embodiment.

FIG. 4 shows a state 450 in which a half mirror 110 shows the reflected images of a plurality of persons according to the second embodiment. In the state 450 shown in FIG. 4, two persons exist in front of the half mirror 110, which shows reflected images 400 and 401 of the respective persons. More specifically, the first person of the reflected image 400 is standing at a distance d1 from the half mirror 110, and the second person of the reflected image 401 is standing behind the first person at a distance d2 (d1<d2) from the half mirror 110.

Assume that the second person asks "do you drink?" in this state. A mirror system 190 uses a well-known speech recognition and interpretation engine or the like to interpret the English question asked by the second person into Chinese, and displays it in a balloon 421. That is, the mirror system 190 presents the question by the second person to the first person. Since the first person is assumed to have a conversation while fixing his/her eye on the face portion of the reflected image 401 of the second person as a speaker, the balloon 421 is desirably presented at the same depth as that of the face portion of the reflected image 401.

The native language of the first person is displayed in the balloon 421 corresponding to the second person, and the first person understands the question of the second person, and answers in his/her native language. The mirror system 190 then interprets the answer into the native language of the second person via the speech recognition and interpretation engine or the like, and displays it in a balloon 420. The balloon 420 is presented at the same depth as that of the reflected image 400 of the first person. As described above, in the second embodiment, a simultaneous interpretation system which performs simultaneous interpretation between a plurality of persons using the system is implemented.

[Independent Control of Plural Depths]

In the simultaneous interpretation system shown in FIG. 4, the distance d1 between one person and the half mirror 110 is different from a distance d2 between the other person and the half mirror 110. Therefore, it is necessary to present, to the two persons or a person who observes them, the balloons 420 and 421 at depths corresponding to the distances d1 and d2 of the two persons, respectively. Furthermore, since the two persons freely change their standing positions, it is necessary to independently control the depths when displaying the independent balloons 420 and 421.

Figure 5:
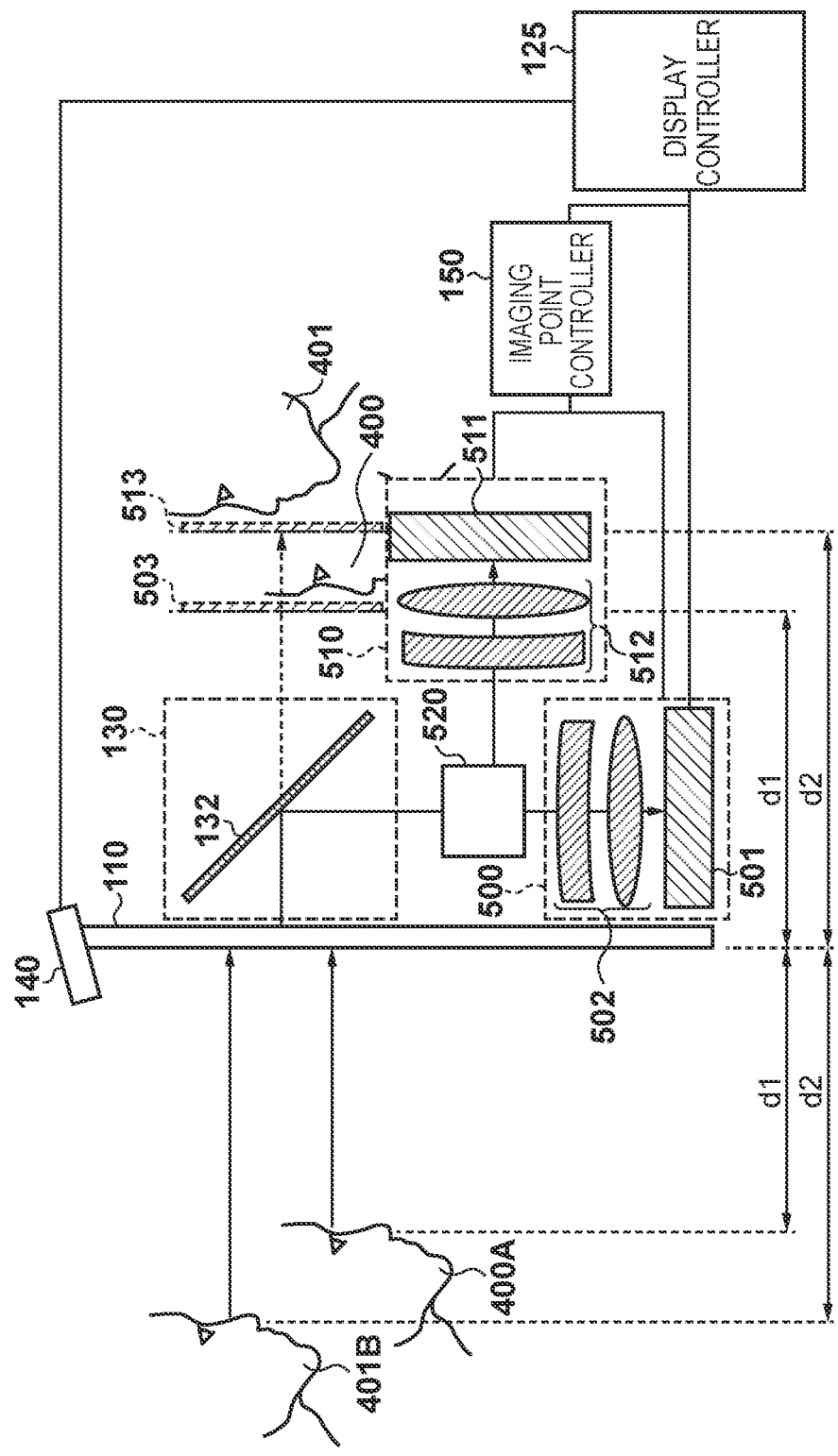
FIG. 5 is a block diagram showing a system configuration (sequential control scheme) according to the second embodiment.
Figure 6:
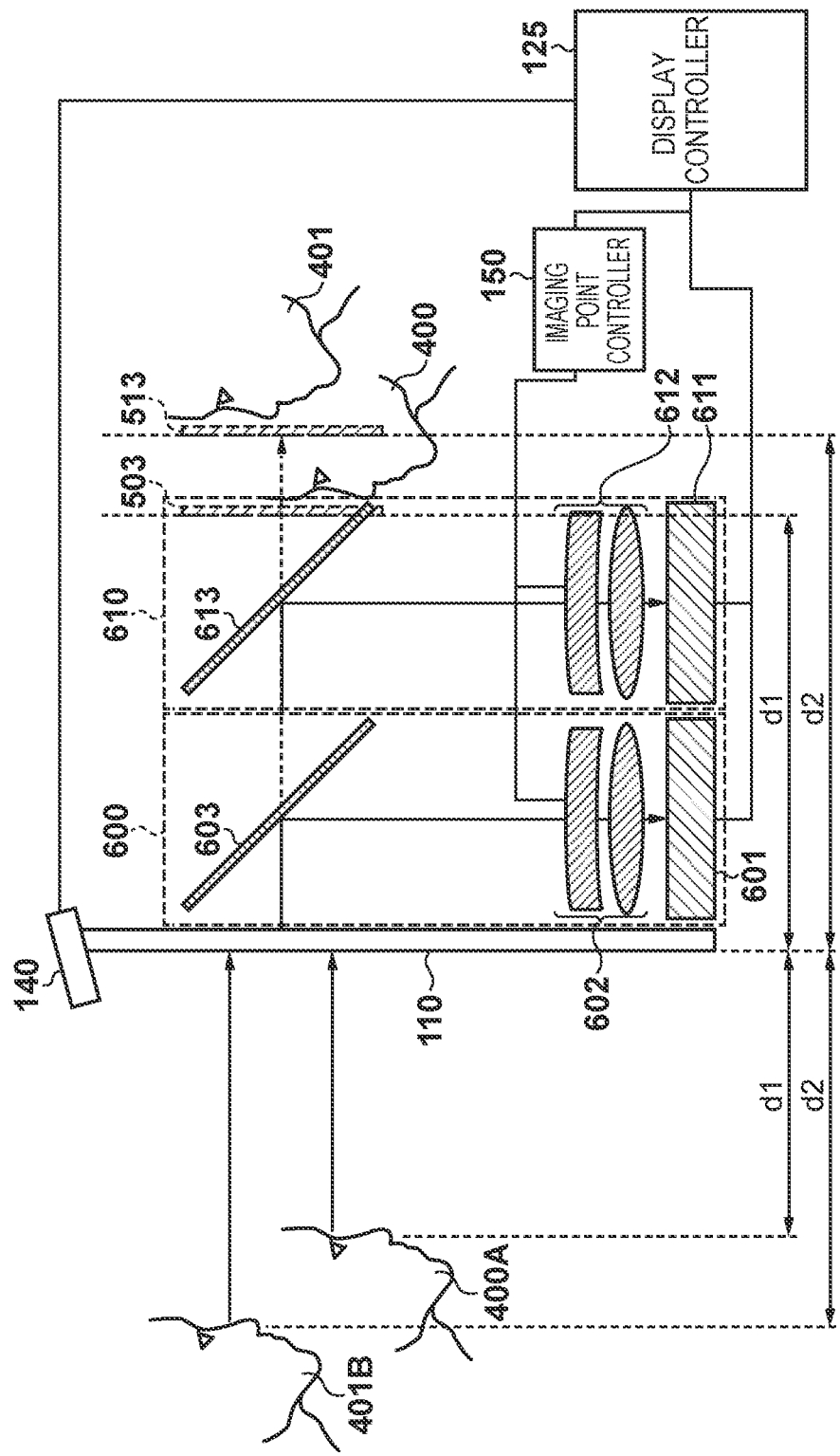
FIG. 6 is a block diagram showing a system configuration (parallel control scheme) according to the second embodiment.

A configuration for independently controlling a plurality of depths will be described below. FIGS. 5 and 6 are block diagrams each showing the configuration of the mirror system according to the second embodiment, in which a plurality of depths are controlled by different schemes.

Sequential Control Scheme

A case in which virtual images are presented at a plurality of depths by the sequential control scheme will be described with reference to FIG. 5. An object position acquisition unit 140 according to the second embodiment incorporates an engine which performs face recognition for a video captured by a video camera. Based on the face sizes of persons 400A and 401B recognized by the engine, the depths of the persons are estimated, thereby acquiring the pieces of depth information (distances d1 and d2) of the respective persons. That is, the depth d1 is estimated based on the size of an face recognition output rectangle 410 (see FIG. 4) for the first person 400A, and the depth d2 is estimated based on the size of an face recognition output rectangle 411 (see FIG. 4) for the second person 401B. Such face recognition detection enables to detect a virtual image position control target.

Referring to FIG. 5, in addition to the components (FIG. 1) of the first embodiment, an image display system 500 for presenting the image of the balloon 420 and an image display system 510 for presenting the image of the balloon 421 are included. The image display system 500 is constituted by an image display unit 501 and a lens system 502. The image display system 510 is constituted by an image display unit 511 and a lens system 512. An imaging point controller 150 can control the focal lengths of the lens systems 502 and 512, similarly to the lens system 131 shown in FIG. 1 in the first embodiment. The control operations, however, are performed independently of each other. The image display units 501 and 511 can display different presentation images.

In the configuration shown in FIG. 5, a light guide switching unit 520 is further included to sequentially guide light from the image display system 500 and that from the image display system 510 to the reflection mirror 132, and enable one of the image display systems, thereby selectively presenting the display images of the image display units 501 and 511. It is also possible to present the two presentation images as if they are simultaneously displayed, by causing the light guide switching unit 520 to perform time-divisional switching to alternately display the display images of the image display units 501 and 511, and shortening the switching interval, as a matter of course.

Parallel Control Scheme

A parallel control scheme of parallelly presenting virtual images at a plurality of depths by including a plurality of image display systems which are spatially independent from each other will be described with reference to FIG. 6.

Referring to FIG. 6, an image display system 600 for presenting the image of the balloon 420 and an image display system 610 for presenting the image of the balloon 421 are included. The image display system 610 includes an image display unit 611, a lens system 612, and a reflection mirror 613, similarly to the optical system 130 of the first embodiment. The imaging point controller 150 controls the focal length of the lens system 612 according to the depth d2 estimated for the person 401B. With this operation, a virtual image 513 of the balloon 421 is imaged at an appropriate point according to movement of the person 401B.

On the other hand, the image display system 600 includes an image display unit 601, a lens system 602, and a reflection mirror 603. Unlike the image display system 610, however, the reflection mirror 603 is a half mirror which reflects some of incident light and transmits the remaining light. The imaging point controller 150 controls the focal length of the lens system 602 according to the depth d1 estimated for the person 400A. With this operation, a virtual image 503 of the balloon 420 is imaged at an appropriate point according to movement of the person 400A.

If the imaging point controller 150 independently controls the focal lengths of the lens systems 602 and 612, the display images of the image display units 601 and 611 are simultaneously presented.

As described above, according to the second embodiment, in the mirror system shown in the first embodiment, it is possible to independently control to present each of presentation images for a plurality of objects at the same depth as that of the reflected image of a corresponding object. This can implement a simultaneous interpretation system which provides speeches by a plurality of persons as presentation images.

Third Embodiment

The third embodiment of the present invention will be described below. The third embodiment shows a case in which in the mirror system shown in the above-described first embodiment, a system used by the user to check the form of a game or sport in front of a mirror is implemented. That is, the system individually presents virtual images with different depths for partial regions (parts) of the body of the user. Note that in the mirror system according to the third embodiment, the same components as those shown in FIG. 1 in the above-described first embodiment have the same reference numerals, and a description thereof will be omitted.

Figure 7:
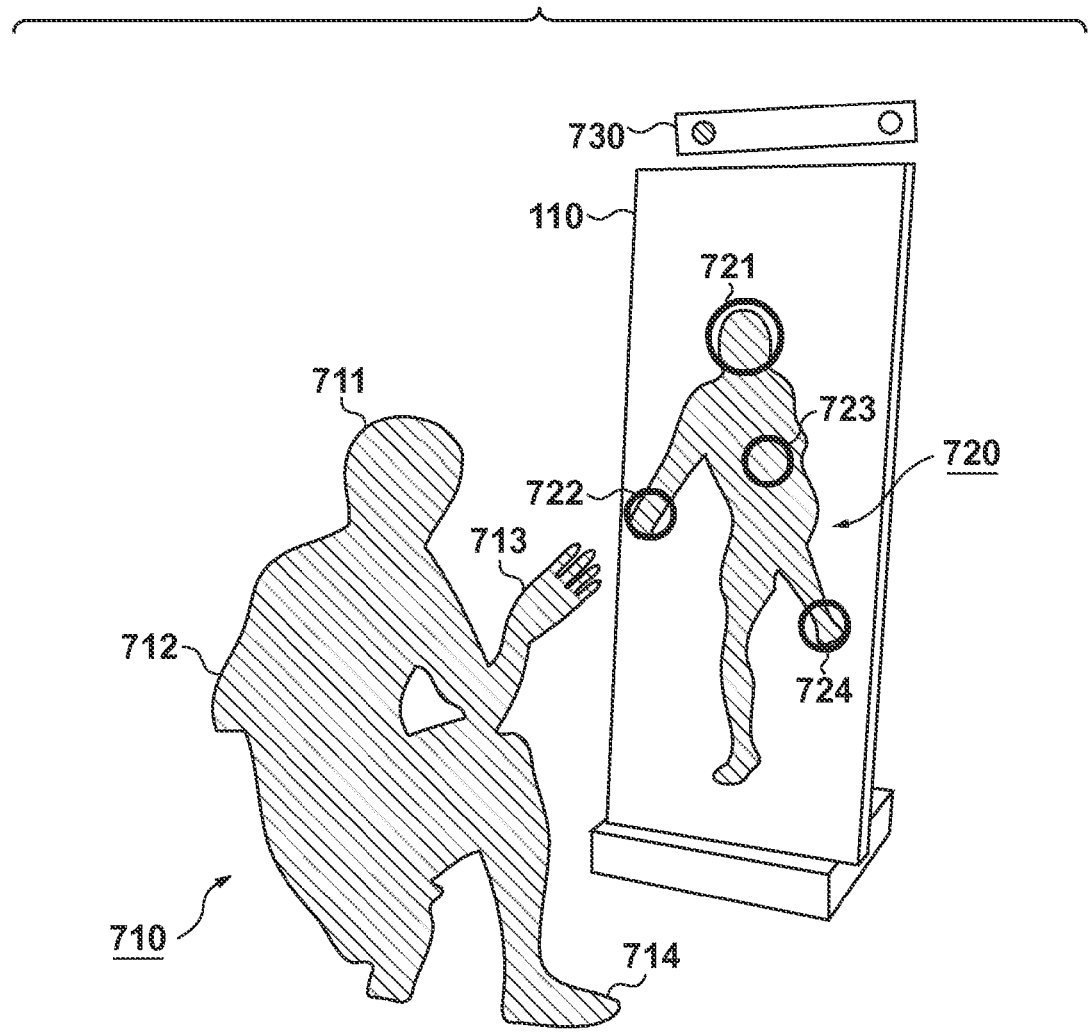
FIG. 7 is a view showing the use of a mirror system according to the third embodiment.

FIG. 7 is a view showing the use of the mirror system according to the third embodiment, in which a half mirror 110 shows a reflected image 720 of a user 710 as an object which is standing and taking a predetermined pose for a sport or game in front of the half mirror 110. In this example, a head 711, a left hand 712, a right hand 713, and a right toe 714 as some portions (to be referred to as "parts" hereinafter) of the user 710 are at different depths with respect to the half mirror 110. In the third embodiment, presentation images 721 to 724 respectively corresponding to the depths of the parts 711 to 714 of the user 710 are superimposed and displayed on the respective parts.

As shown in FIG. 7, in the third embodiment, an object position acquisition unit 730 for acquiring a distance d between the user 710 and a mirror surface is arranged above the half mirror 110. The object position acquisition unit 730 is constituted by a depth camera for acquiring an image with a depth of the user 710 using infrared pattern illumination. The user 710 takes a basic posture before taking the predetermined pose, and the object position acquisition unit 730 captures an image of the basic posture, thereby acquiring the initial states of the respective parts 711 to 714 of the user 710. The parts 711 to 714 are then sequentially tracked, thereby acquiring the depth information of each of the parts 711 to 714.

Figure 8:
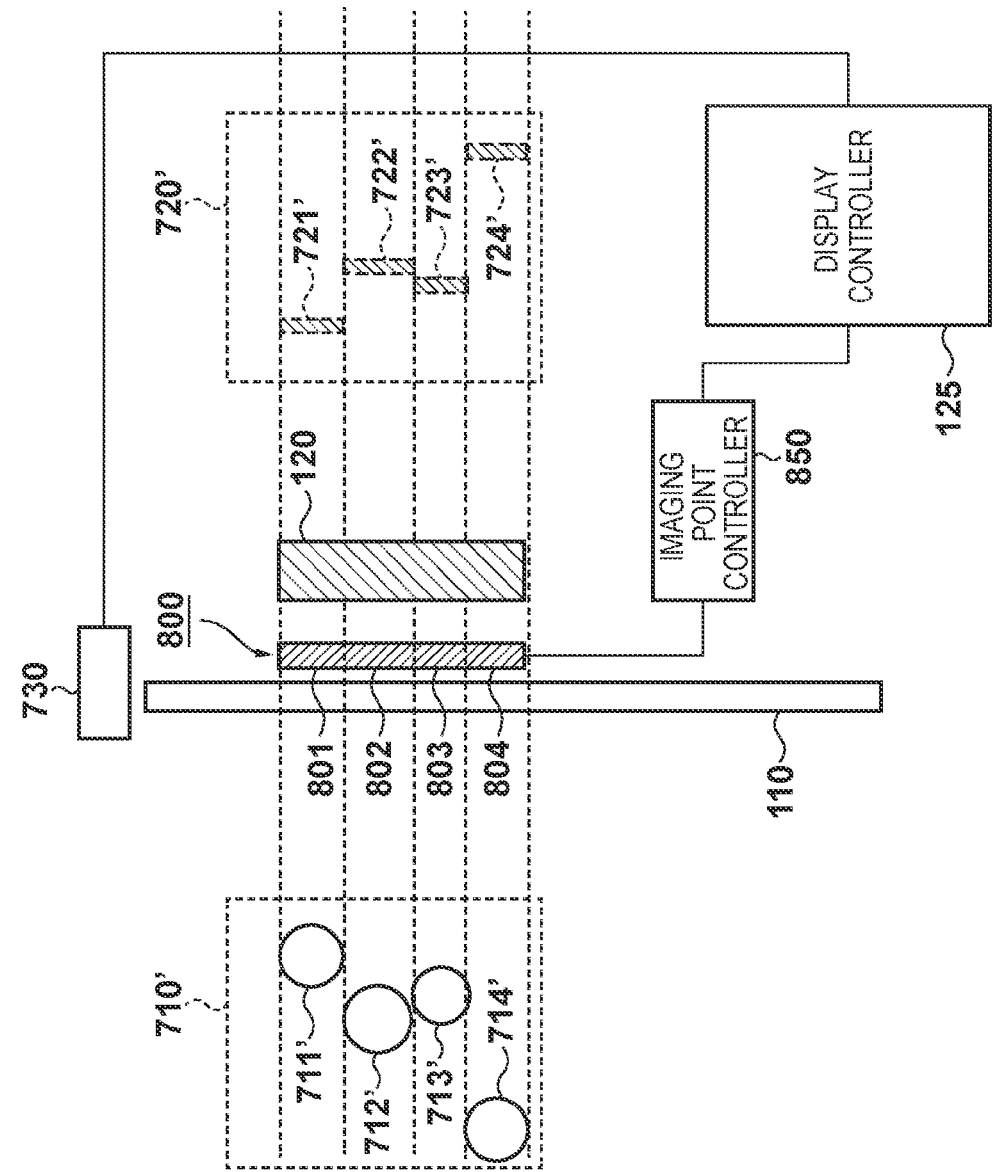
FIG. 8 is a block diagram showing a system configuration according to the third embodiment.

FIG. 8 is a block diagram showing the configuration of the mirror system according to the third embodiment. Referring to FIG. 8, a rectangular frame 710' indicates the user, and a rectangular frame 720' indicates the reflected image of the user. Parts 711' to 714' within the rectangular frame 710' indicate the respective parts of the body of the user 710, and have different depths. The reflected images of the parts 711 to 714 are displayed as parts 721' to 724' with corresponding depths within the rectangular frame 720'.

An LCD display similar to that in the first embodiment is used as the image display unit 120 in the third embodiment. The image display unit 120 is arranged so that its display surface faces the rear surface (the side on which a user 700 does not exist) of the half mirror 110. An optical controller 800 in which a plurality of lens units whose imaging points are independently controllable are two-dimensionally arranged is inserted between the half mirror 110 and an image display unit 120. The optical controller 800 controls the imaging point of a corresponding lens unit for each partial region obtained by dividing the display region of the image display unit 120. A case in which a varifocal lens array such as a liquid lens array (for example, an electrowetting cell) or liquid crystal lens array is used as the optical controller 800 will be described below.

The display controller 125 according to the third embodiment can acquire the depth information and the position on the screen of each of the parts 711 to 714 from the image with the depth acquired by the object position acquisition unit 730. The display controller 125 extracts, from the acquired information, a partial region 801 (a set of vrifocal lenses) of the optical controller 800 corresponding to the head 711 of the user on the image with the depth. Partial regions 802 to 804 respectively corresponding to the remaining parts 712 to 714 are also extracted in a similar manner.

An imaging point controller 850 calculates appropriate focal length information for the partial regions 801 to 804 of the optical controller 800 based on the depth information of the parts 712 to 714 input from the display controller 125, respectively, thereby controlling each focal length. As described above, in the third embodiment, the focal length is changed for each of the partial regions 801 to 804 of the optical controller 800. With this processing, among the presentation images displayed on the image display unit 120, the virtual images 721 to 724 of partial images corresponding to the parts 711 to 714 are generated at positions corresponding to the depths, respectively.

According to the third embodiment, it is possible to present a virtual image according to a corresponding depth for each of the partial regions with different depths. That is, it is possible to control a plurality of depths within one screen.

Note that a varifocal lens array is used as the optical controller 800 in the third embodiment. The present invention, however, is applicable to any device such as a varifocal mirror array as long as it can control the focal length for each partial region.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-100347 filed Apr. 25, 2012 which is hereby incorporated by reference herein in its entirety.

What is claimed is:

1. A mirror system for displaying an image on a mirror surface, comprising:
   a mirror which reflects incident light from an object facing on a front surface side to present a reflected image, and transmits incident light from a rear surface;
   a display unit configured to generate a presentation image to be superimposed on the reflected image;
   an optical unit which is arranged between the display unit and the rear surface of the mirror, and images the presentation image;
   an acquisition unit configured to acquire distance information between the object and the mirror in a depth direction with respect to the mirror surface; and
   a controller configured to control, in the depth direction, an imaging point of the presentation image by the optical unit according to the distance information in the depth direction, such that the presentation image is arranged at a position where the same angle of convergence and focal length as those of the reflected image of the object are obtained, and such that the position of the presentation image is adjusted forward or backward with respect to the mirror.

2. The system according to claim 1, wherein the controller controls the imaging point of the presentation image by the optical unit so that the presentation image is observed as an image with a depth corresponding to the distance information from the front surface of the mirror.

3. The system according to claim 1, wherein the controller controls the imaging point of the presentation image by the optical unit so that a virtual image of the presentation image appears at a position corresponding to the distance information on the rear surface side of the mirror.

4. The system according to claim 1, wherein the controller controls a focal length of a lens system of the optical unit according to the distance information.

5. The system according to claim 1, further comprising:
an imaging unit configured to capture the object; and
a generator configured to generate image data of the presentation image based on an image obtained by capturing the object, and supply the image data to the display unit.

6. The system according to claim 1, wherein the display unit comprises a plurality of display sections capable of displaying presentation images different from each other,
the optical unit comprises a plurality of optical systems arranged between the plurality of respective display sections and the rear surface of the mirror, and
the controller controls imaging points of presentation images by the plurality of optical systems.

7. The system according to claim 6, wherein
the acquisition unit acquires distance information of each of a plurality of objects,
the plurality of display sections respectively generate presentation images corresponding to the plurality of objects, and
the controller controls an imaging point of the presentation image corresponding to each of the plurality of objects according to the distance information of the object.

8. The system according to claim 6, wherein the optical unit comprises an optical switch configured to guide light from one of the plurality of optical systems to the rear surface of the mirror.

9. The system according to claim 1, wherein
the optical unit comprises a lens array in which a plurality of lens units each capable of controlling an imaging point are arranged in parallel, and
the controller controls, for each of partial regions obtained by dividing a display region of the display unit, the imaging point of the lens unit of the lens array corresponding to the partial region.

10. A control method of a mirror system which displays an image on a mirror surface and comprises:
a mirror which reflects incident light from an object facing on a front surface side to present a reflected image, and transmits incident light from a rear surface;
a display unit configured to generate a presentation image to be superimposed on the reflected image; and
an optical unit which is arranged between the display unit and the rear surface of the mirror, and images the presentation image,
the control method comprising:
acquiring distance information between the object and the mirror in a depth direction with respect to the mirror surface; and
controlling, in the depth direction, an imaging point of the presentation image by the optical unit according to the distance information in depth direction, such that the presentation image is arranged at a position where the same angle of convergence and focal length as those of the reflected image of the object are obtained, and such that the position of the presentation image is adjusted forward or backward with respect to the mirror.

11. A non-transitory computer readable medium storing a program for causing a computer to perform a control method of a mirror system which displays an image on a mirror surface and comprises:
a mirror which reflects incident light from an object facing on a front surface side to present a reflected image, and transmits incident light from a rear surface;
a display unit configured to generate a presentation image to be superimposed on the reflected image; and
an optical unit which is arranged between the display unit and the rear surface of the mirror, and images the presentation image,
the control method comprising:
acquiring distance information between the object and the mirror in a depth direction with respect to the mirror surface; and
controlling, in the depth direction, an imaging point of the presentation image by the optical unit according to the distance information in a depth direction, such that the presentation image is arranged at a position where the same angle of convergence and focal length as those of the reflected image of the object are obtained, and such that the position of the presentation image is adjusted forward or backward with respect to the mirror.

* * * * *